US012380112B2

(12) United States Patent
Hurley et al.

(10) Patent No.: US 12,380,112 B2
(45) Date of Patent: *Aug. 5, 2025

(54) WORLD KNOWLEDGE TRIGGERS

(71) Applicant: Google LLC, Mountain View, CA (US)

(72) Inventors: Fergus Gerard Hurley, San Francisco, CA (US); Robin Dua, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/743,224

(22) Filed: Jun. 14, 2024

(65) Prior Publication Data

US 2024/0338371 A1  Oct. 10, 2024

Related U.S. Application Data

(63) Continuation of application No. 18/300,046, filed on Apr. 13, 2023, now Pat. No. 12,050,607, which is a
(Continued)

(51) Int. Cl.
*G06F 16/24* (2019.01)
*G06F 16/2455* (2019.01)
(Continued)

(52) U.S. Cl.
CPC ...... *G06F 16/24565* (2019.01); *G06F 16/248* (2019.01); *G06F 16/9535* (2019.01);
(Continued)

(58) Field of Classification Search
CPC ............. G06F 16/9535; G06F 16/248; G06F 16/24565
See application file for complete search history.

(56) References Cited

U.S. PATENT DOCUMENTS 6,314,453 B1 * 11/2001 Hao .................... H04L 67/1095
709/204
7,334,000 B2    2/2008 Chhatrapati et al.
(Continued)

FOREIGN PATENT DOCUMENTS

CN    101662831    3/2010
CN    102799751    1/2012
(Continued)

OTHER PUBLICATIONS

International Preliminary Report on Patentability for Application No. PCT/US2016/031447, mailed Nov. 28, 2017, 7 pages.
(Continued)

*Primary Examiner* — Eliyah S. Harper
(74) *Attorney, Agent, or Firm* — DORITY & MANNING, P.A.

(57) ABSTRACT

Methods, systems, and apparatus, for associating actions with events that are determined independent of the action type of the action. A system receives, from a user device, identification of an action to be taken, the action being one of a plurality of action types, and an identification of a first event that is determined independent of the action type and for which the occurrence of the first event may be determined by the system. They system associates the action and the first event with instructions for determining if the first event has occurred, and then determines whether the first event has occurred. In response to determining that the first event has occurred, the system causes the action to occur.

20 Claims, 11 Drawing Sheets

Related U.S. Application Data continuation of application No. 17/587,493, filed on Jan. 28, 2022, now Pat. No. 11,663,217, which is a continuation of application No. 16/836,547, filed on Mar. 31, 2020, now Pat. No. 11,256,700, which is a continuation of application No. 14/752,207, filed on Jun. 26, 2015, now Pat. No. 10,642,843.

(60) Provisional application No. 62/167,742, filed on May 28, 2015.

(51) Int. Cl.
| | | |
|---|---|---|
| *G06F 16/248* | (2019.01) | |
| *G06F 16/9535* | (2019.01) | |
| *G06F 16/9537* | (2019.01) | |
| *G06Q 10/109* | (2023.01) | |
| *H04W 4/029* | (2018.01) | |
| *G06F 3/04842* | (2022.01) | |

(52) U.S. Cl.
CPC ....... *G06F 16/9537* (2019.01); *G06Q 10/109* (2013.01); *H04W 4/029* (2018.02); *G06F 3/04842* (2013.01)

(56) References Cited

U.S. PATENT DOCUMENTS

| | | | |
|---|---|---|---|
| 8,766,793 B2 | 7/2014 | Elumalai et al. | |
| 9,519,488 B2 | 12/2016 | Kwon et al. | |
| 9,529,488 B2 * | 12/2016 | Beechuk | G06F 40/143 |
| 10,878,432 B2 * | 12/2020 | Nasir | H04L 67/53 |
| 11,520,927 B1 * | 12/2022 | Salour | G06F 21/60 |
| 2004/0019603 A1 | 1/2004 | Haigh et al. | |
| 2004/0030753 A1 | 2/2004 | Horvitz | |
| 2005/0251558 A1 | 11/2005 | Zaki | |
| 2006/0107224 A1 | 5/2006 | Friend et al. | |
| 2006/0195455 A1 | 8/2006 | Shah et al. | |
| 2006/0227997 A1 | 10/2006 | Au et al. | |
| 2007/0055656 A1 | 3/2007 | Tunstall-Pedoe | |
| 2007/0167136 A1 | 7/2007 | Groth | |
| 2008/0004926 A1 | 1/2008 | Horvitz et al. | |
| 2008/0104026 A1 | 5/2008 | Koran | |
| 2008/0136592 A1 | 6/2008 | Malik et al. | |
| 2008/0195455 A1 * | 8/2008 | May | G06Q 10/1093 705/41 |
| 2009/0157672 A1 | 6/2009 | Vemuri | |
| 2010/0271202 A1 * | 10/2010 | Lin | B60R 25/00 340/540 |
| 2011/0055193 A1 | 3/2011 | Lauridsen et al. | |
| 2011/0093490 A1 * | 4/2011 | Schindlauer | G06F 16/835 707/769 |
| 2012/0029334 A1 | 11/2012 | Lin | |
| 2013/0232006 A1 | 9/2013 | Holcomb et al. | |
| 2014/0100904 A1 | 4/2014 | Wolf et al. | |
| 2014/0247383 A1 | 9/2014 | Dave et al. | |
| 2014/0282586 A1 | 9/2014 | Shear et al. | |
| 2015/0234862 A1 * | 8/2015 | Patil | G06F 16/951 707/706 |
| 2019/0272312 A1 * | 9/2019 | Pinard | G06F 40/174 |
| 2020/0279304 A1 * | 9/2020 | Jenkins | G06Q 30/0255 |
| 2020/0368616 A1 * | 11/2020 | Delamont | H04N 13/239 |
| 2022/0036488 A1 | 2/2022 | Brutsche | G06N 20/00 |
| 2022/0156266 A1 * | 5/2022 | Hurley | H04W 4/029 |
| 2023/0328579 A1 * | 10/2023 | Nuggehalli | H04W 28/0967 |
| 2024/0168744 A1 * | 5/2024 | Mohan | G06F 8/71 |

FOREIGN PATENT DOCUMENTS

| | | |
|---|---|---|
| CN | 103514533 | 1/2014 |
| CN | 103582896 | 2/2014 |
| CN | 104111991 | 10/2014 |
| CN | 104537064 | 4/2015 |
| WO | WO 2012/167168 | 12/2012 |
| WO | WO 2014/042798 | 3/2014 |

OTHER PUBLICATIONS

International Search Report and Written Opinion in International Application No. PCT/US2016/031447, mailed Jul. 29, 2016, 11 pages.

* cited by examiner

WORLD KNOWLEDGE TRIGGERS

CLAIM OF PRIORITY

This application is a continuation of U.S. application Ser. No. 18/300,046 having a filing date of Apr. 13, 2023, which is a continuation of U.S. application Ser. No. 17/587,493 having a filing date of Jan. 28, 2022, which is a continuation of U.S. application Ser. No. 16/836,547 having a filing date of Mar. 31, 2020, issued as U.S. Pat. No. 11,256,700, which is a continuation of U.S. application Ser. No. 14/752,207, having a filing date of Jun. 26, 2015, issued as U.S. Pat. No. 10,642,843, which claims the benefit of U.S. Provisional Application Ser. No. 62/167,742, filed on May 28, 2015, the entire disclosure of which is incorporated herein by reference.

BACKGROUND

The advent of cloud based services, search engines, mobile applications, and location-aware devices have drastically expanded the utility of mobile user devices over the last decade. Many such user devices now provide context-aware services and applications in addition to voice and data access. Furthermore, with the recent advances in processing systems, many previously disparate applications and services are now able to work together to provide enhanced capabilities and user experiences.

Many application services available to users are instantiated by use of command inputs. One such service is creating action triggers. For example, a user may speak (or type) the input "remind me to buy milk this evening" into a smartphone, and the smartphone, using a command parsing application (or, alternatively, communicating with a command parsing service) will invoke an action trigger process that may create a reminder, create messages and/or calendar entries, and solicit additional information from the user. Such information may be a time, if the user desires for the action trigger to be performed at a certain time, and/or a location, if the user desires for the action trigger to be performed when the user arrives at the location. While the setting of such action triggers is a very useful and relatively fluid user experience, available triggers historically have been limited to a set of options provided by an application or service.

SUMMARY

This specification relates to creating triggers for certain actions or activities based on (defined by) one or more occurrences or events that may be of a type that is independent of the types of the certain actions. The occurrences or events are independent in that they need not be selected from a list that is dependent on the action type or activity type selected, but rather may be defined by the user according to one or more inputs.

The triggers may be periodically monitored by one or more computing systems. The occurrences or events are of a type that may be identified by a web search engine. The occurrences or events are not limited to the user's system or set of applications, but may come from the array of occurrences or events in the world around the user. Therefore, triggers based on such occurrences or events are also referred to herein as world triggers.

Certain subject matter described in this specification can be implemented so as to realize one or more of the following advantages. A user may create triggers based on a much wider range of occurrences or events than heretofore possible. A trigger may invoke a reminder to a user, such that action to be taken based on such trigger is taken manually as prompted by the reminder. For example, a user may set a trigger to remind herself to purchase a new laptop computer when the price for the desired model drops below a certain price at a certain on-line retailer. Alternatively, a trigger may simply provide information for the user's interest, with no further action necessarily implied. For example, a user may set a trigger to be alerted when the price of a certain stock drops below a certain value. As another alternative, a user may set a trigger to automatically take some action. For example, a user may set a trigger to purchase tickets to a concert when those tickets go on sale (with all aspects of the purchase handled by the system in response to determining that the tickets have gone on sale). As still another alternative, a user may set a trigger to present a single approval action upon occurrence of an event. For example, a user may set a trigger to present the user with a "buy" button when the aforementioned concert tickets go on sale (the system automatically completes the purchase only upon the user's activation of the "buy" button).

Triggers may be set from a dedicated reminder application, another form of application such as a browser or calendar, or some other type of system configured to receive user input for the purpose of establishing a trigger, checking for occurrences or events associated with the trigger, and alerting the user (i.e., triggering) upon satisfaction of the criteria associated with the occurrences or event. These latter systems may include search engines, electronic assistants, including voice-based assistants, and the like. Furthermore, a triggering and notification system may be configured to communicate with an otherwise independent user interface front-end, such that user instructions and notifications can be managed by the user interface front end.

A trigger may be based on a single occurrence or event. For example, a user may define a trigger to be reminded to purchase tickets to a movie of interest on the movie's release date. Alternatively, multiple occurrences or events may be grouped together to define a trigger. For example, a user may create a trigger to be reminded to purchase tickets to a movie of interest on its release date but only when the release date is not otherwise booked on a spouse's calendar.

In certain implementations, the establishment of a trigger creates a recurring search request that a search system may implement. Results of the search may be analyzed to determine a state of the searched-for content. If the determined state satisfies conditions set by the trigger, the trigger is activated. Otherwise, it is not. For example, a trigger may be set to alert the user when the stock price for company A goes below $50. A search system may periodically perform a search for the price of stock for company A. The search system may provide the search results to an analysis system which performs a test to determine if the price is below the user-set threshold of $50 per share. The output of the analysis system may be provided to a notification system that notifies the user if and only if the analysis system provides the result that the price has been determined to be below the user-set threshold of $50 per share.

The searching and determination of occurrences or events is, in essence, a determination of changes of state external to the user. These changes of state result in triggers for a system to take some action-essentially, triggers based on a selected change of state in the world, or world triggers. While the changes of state are with respect to occurrences or events external to the user, the search triggering may be independent or dependent on user actions. For example, the searching may be a function of time interval, such as search once per day at 7:00 a.m. local time, which is independent of user activity. Or, the searching may be a function of user location or action, such as when the user (or user's mobile device) is determined to travel from location A to location B, which is dependent on user activity. As merely one example, a user may set a trigger to be prompted to purchase paper towels when the user is at store A, but only if the cost of those paper towels is lower (as determined by the search and analysis process described above) than the cost of the towels at stores B, C, and D. These are examples to highlight certain differences between triggering occurrences or events and search initiation, and do not limit the scope of this disclosure.

The creation of a user defined action and a trigger specifying a trigger independent of the user defined action reminder to be presented (or to be performed) allows for the user to specify a context that is unique to the user and for which the user desires to be reminded of the action (or desires the action to be automatically performed). For example, if the user selects a user defined action to watch a particular professional sports game, such as [Watch Team A] when [Team A plays Team B], the user can be reminded of the user defined action when the user is unaware of Team A's schedule. This obviates the need for a user to keep track of a particular schedule for Team A.

The user defined action may be triggered based on information available through the web, data accessible through applications, or data in user approved private networks. Additionally, the user defined action may be triggered without the user having personal knowledge of an occurrence of a trigger.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An action trigger processing system facilitates the creation of user defined actions and user defined trigger events. In operation, the action trigger processing system receives an input (e.g., performed via text input, voice commands, click selection, among others) at the user device of a user defined action. The action trigger processing system may also receive a user defined event, and when the action trigger processing system determines an occurrence of the user defined event, a notification of the user defined action can be provided to the user device. This notification enables the user to complete the action at that moment (e.g., by providing a link/button/app icon/etc.), or provides indication that the action was automatically completed, or provide the information related to the action directly in the notification message. For example, a user may select a user defined action to watch a professional sports game such as "Watch Team A," and a user defined event may be "when Team A plays Team B." A reminder for the user defined action would not be triggered to be presented to the user at the user device until the action trigger processing system determines the occurrence of the user defined event. The user defined action and user defined event can be stored in action trigger data as an action trigger.

Additionally, in some implementations the activity trigger processing system may receive a selection by the user of additional events that indicate a condition to be satisfied. For example, the user may define a condition to be at home to be reminded to watch Team A when Team A plays Team B. Thus, if a user is at work when Team A plays Team B, the user will not be reminded to watch Team A.

The action trigger processing system can analyze and determine the occurrence of the user defined event in a number of ways. For example, event data can be updated and/or searched. In some implementations, an information source, such as a web corpus or knowledge base, or combination of both, can be searched to determine if events have occurred. The information source can be, for example, searched by a search engine invoked by the action triggering processing system. For example, the action trigger processor can utilize the search engine to determine if there is an occurrence of the user defined event.

The action trigger processing system can be implemented in the user device, or in a computer system separate from user device, such as a server system. In the case of the latter the server system receives input from the user device and sends data to the user device for processing. These features and additional features are described in more detail below.

Figure 1:
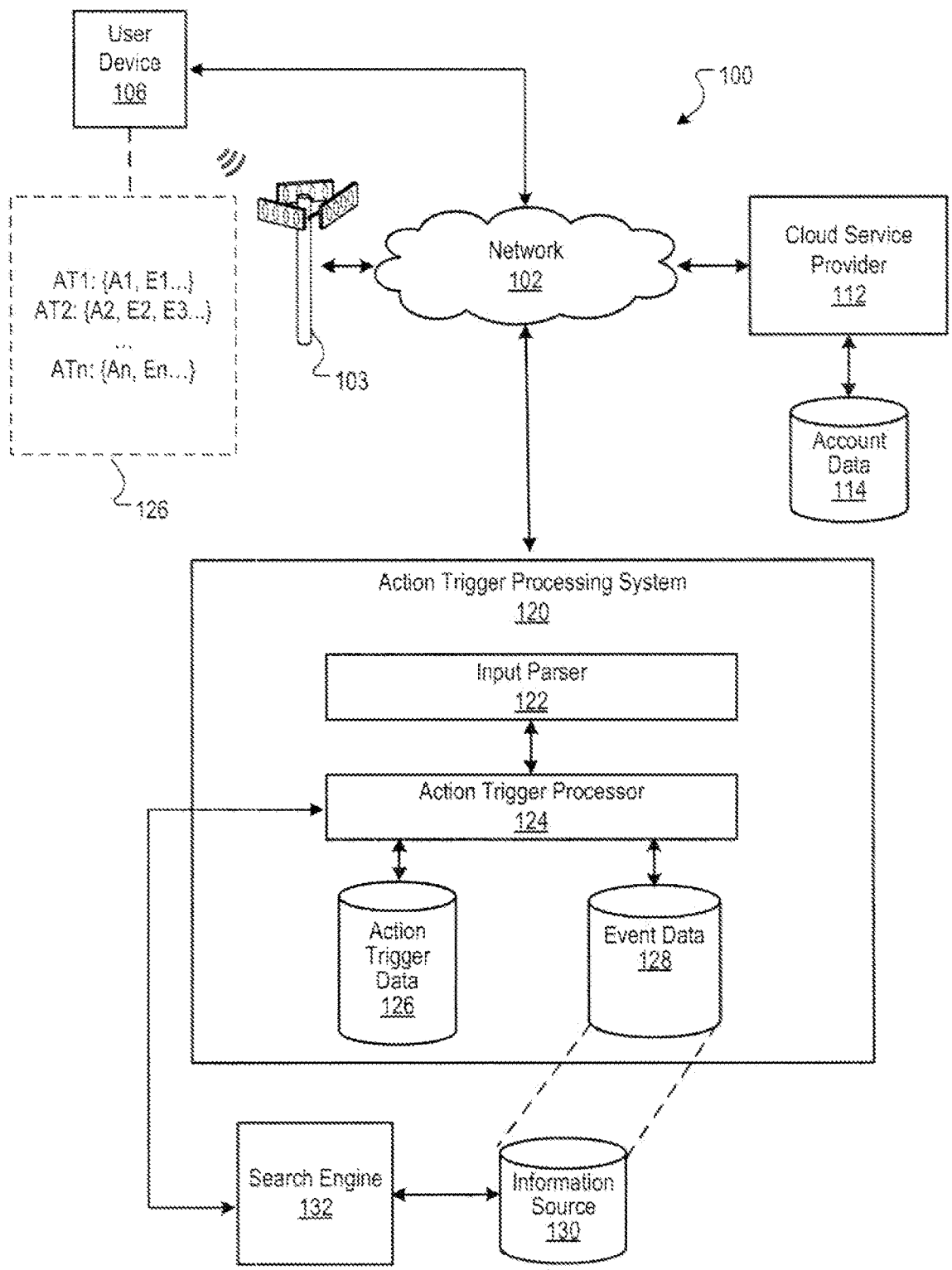
FIG. 1 is a block diagram of an example environment in which command inputs are processed for action triggers based on an occurrence of a world knowledge trigger.

FIG. 1 is a block diagram of an environment 100 in which command inputs are processed for reminder tasks and reminder triggering. A computer network 102, such as the Internet, or a combination thereof, provides for data communication between electronic devices and systems. The computer network 102 may also include, or be in data communication with, one or more wireless networks 103 by means of one or more gateways.

User device 106 is an electronic device that is under the control of a user and is capable of requesting and receiving resources over the network 102, also capable of performing other actions. Example user devices 106 include personal computers, mobile communication devices, wearable devices, and other devices that can send and receive data over the network 102. In the example of FIG. 1, the user device 106 is a smartphone. An example smartphone is described with reference to FIG. 7 below. The user device 106 may communicate over the networks 102 and 103 by means of wired and wireless connections with the networks 102 and 103, respectively. The user device 106 may also be a device that accesses the network 102 by means of an intermediate device and a short range wireless transceiver, such as a WiFi, Bluetooth, etc. As described with reference to FIG. 6, a user device may be able to perform a set of device actions for various programs and capabilities.

The user device 106 is associated with a user account, such as an account hosted by a cloud service provider 112 that provides multiple services. These services may include search (web, intranet, documents, and applications, among others), web mail, calendar, social networking, messaging, documents storage and editing, an electronic assistant service, etc. The account data 114 may store data specific to the account of the user device 106. Further, although only one user device 106 is shown in FIG. 1, a plurality of user devices 106 may be included.

An action trigger processing system 120 receives command inputs from user devices and processes the inputs to determine which, if any, actions are to be taken in response to the input. While the action trigger processing system 120 is shown as a separate entity in FIG. 1, the action trigger processing system 120 can be implemented in the cloud service provider 112, or even in the user device 106.

Inputs may invoke various actions, as determined by the action trigger processing system 120. For example, an input may include characters and/or terms (e.g., letters or numbers). Also, an input may be interpreted as a search query command, in which case a search query is sent to a search service. Likewise, an input may be interpreted as a command to place a phone call, in which case the user device 106 attempts to establish a voice communication over the network 103. Likewise, an input may be interpreted as a user defined action, in which case an action trigger may be generated. The generation of action triggers, user defined actions, user defined events, and the processing of such items are described in more detail below.

In some implementations, each input is processed by an input parser 122, which is programmed to parse the input terms, including the characters and terms that are input, and determine what actions, if any should be taken. In some implementations, the input parser 122 may access language models to determine which commands or actions to take. Such language models may be statistically based, e.g., models may include weights assigned to particular words and phrases that are determined to be semantically relevant to a particular command, or rule-based, e.g., grammars that describe sentence structures for particular commands. A variety of other language and text input processing systems may be used.

As described above, a user may input a command on the user device 106, and the action trigger processing system 120 processes the command input to determine whether the command input relates to an action to be taken. The action to be taken can be an action that is performed by the user device, or an action that is performed by another, separate system. For example, an action to be performed by the user device may be the presentation of a reminder, the sending of a text message, or other actions that the user device is capable of performing. An action to be taken by another system may be, for example, the purchase of an asset, securing a reservation at a restaurant, and the like.

Furthermore, the action to be taken at the user device may simply involve the presentation of a confirmation to take an action, where the action to be taken may be done by the user device or by a separate system. For example, if the user input is [Buy 10 shares of Company X stock when price is below $530], the action trigger processing system will identify an action to buy 10 shares of Company X stock, and a user-defined event of when the price of Company X stock is below $530. However, the action may be subject to a confirmation action that causes the user device 106 to present a confirmation command to perform the action to purchase the stock. Thus, when the event of Company X stock being below $530 occurs, the user device presents a confirmation command to purchase the 10 shares of stock. Should the user accept the confirmation command, the user device 106 will send a notification to the system 120 that causes a purchase of the stock on behalf of the user.

In some implementations, the action trigger processing system 120 includes an action trigger processor 124 that communicates with the input parser 122. The action trigger processor 124 also accesses action trigger data 126 and event data 128. The action trigger processor 124 can receive user input of a user defined action provided by a user on user device 106. The user defined action is the action the user would like to be presented with or performed at the time of an occurrence of the user defined events (e.g., a reminder to the user at a point in time prior to the user defined event). A user defined action may be described by a plurality of characters (e.g. letters, number, symbols), for example, "Watch the game," "Bring umbrella," "Clean the house." The action trigger processor 124 will store the user defined action in action trigger data 126 for a particular action trigger. There may be a plurality of action triggers AT1, AT2, . . . ATn stored in action trigger data 126, and each of the plurality of reminders may have one or more user defined actions A1, A2, . . . An. A group of action triggers (e.g., those created or previously implemented by the user) may be viewed at the user device 106, and the user may make changes (e.g., add, delete, modify) at the user device 106 to the action triggers at any time.

Additionally, each of the plurality of actions triggers has one or more user defined events E1, E2, . . . En associated with a provided user defined action. Each event is selected by the user and is determined independent of the type of action to which it is to relate. The occurrences or events are independent in that they need not be selected from a list that is dependent on the action type or activity type selected, but rather may be defined by the user according to one or more inputs in addition to the input specifying the action. These one or more inputs may be part of a command that specifies the action, or may be a subsequent series of inputs by the user.

For example, subsequent inputs that are part of a command that specifies the action may be of the form of a command sentence, e.g., [Purchase 10 shares of Company X Stock when the stock is below $530 a share]. Here, the parser 122 identifies an action—"purchase 10 shares of Company X stock]—and an event—"when Company X stock is below $530 a share."

To further illustrate how the event is unrelated to the action, consider the input [Remind me to take Nancy to Consequence movie if Consequence Lousy Bananas rating is above 75%]. Here, the parser 122 identifies an action—present a reminder to take Nancy to the movie Consequence—and an event—"Lousy Bananas rating for Consequence above 75%."

Likewise, a subsequent series of inputs by the user may be a search query input to search an information source 130, such as a web corpus or a knowledge base, to identify events related to the query. For example, a user may input an action to present a reminder to watch a particular pro sports team, e.g., Team A. The user may then issue a query for the schedule of Team A, and results may be presented in the form of events, e.g., "When Team A plays Team B," "When Team A plays Team C," and so on.

Upon the occurrence of a user defined event, the action trigger processor 124 may present the user defined action to the user device 106, and in some implementations, the action trigger processor 124 will perform the user defined action associated with the user defined event. Occurrence of the user defined event may include predicting the user defined event will occur, the user defined event is occurring, and/or the user defined event has occurred. Additionally, in some implementations, upon determining an occurrence of the user defined event prior to a point in time of the user defined event, the user defined action may be presented as a notification to the user device 106 at a time before the user defined event (e.g., as a reminder to perform a user defined action at the time of the user defined event). In some implementations, the user defined actions and/or user defined events may be one-time or repeat action triggers. The user of the user device 106 may be able to set and provide whether the action trigger will repeat or is a one-time action trigger.

Although the examples above describe only one event for an action, there may be multiple events associated with an action. The user may specify the performance of the action using Boolean logic, e.g., the user may specify the action to be performed only if each event occurs, or, alternately, if any of the events occur, or if logical combinations of events specified by the user occur.

Other event types can include a time period condition, location area condition, or person proximity condition, among others. A time period condition may be a date, a date range, a time of day, or a time of day range, among others. For example, AT1 may include a user defined action (A1) of "Bring umbrella" and a user defined event (E1) of "when greater than 50% chance of rain," and the user may also include a time period condition (E2) of "Saturday afternoon," which may be a default or user set time range (e.g., 1 PM-5 PM) on a particular Saturday (e.g., the next Saturday), every Saturday, selected Saturdays, or a pattern of Saturdays (e.g., the first Saturday of every month). Based on this example of reminder AT1, the user defined action (A1) of "Bring umbrella" would not be triggered unless the action trigger processor 124 determines the user defined event E1 of "when greater than 50% chance of rain" occurs on "Saturday afternoon," as defined by time period condition E2 of "Saturday afternoon." Additionally, in some implementations, the time period condition may be based on context provided by the user of the user device 106. For example, the user of the user device 106 may provide a time period condition of "between meetings," which may be determined based on the user's current meeting schedule.

A location area condition may be an area around a particular location (e.g., house address) or type of location (e.g., grocery store, airport, hospital) that the user device is to be within or near for the activity condition to be met. For example, the location area condition may be "At Home," which may be defined by the user on the user device 106. Additionally, "near" can be a particular distance from (e.g., feet or miles) or amount of time away by different modes of transportation (e.g., by car, public transportation, walking) from the identified location. Thus, if a user defined action is set to be "Bring umbrella" and a user defined event of "when greater than 50% chance of rain" is set, the user can also select a trigger condition of "At Home." The action trigger processing system 120 would then notify the user device 106 of the user defined action, "Bring umbrella," if the action trigger processor 124 determines the user defined event is met, or otherwise triggered, when the user of the user device 106 is "At Home." Conversely, if the action trigger processing system 120 determines that the user defined event, "when greater than 50% chance of rain," when the user device 106 is not "At Home," then the user defined action of "Bring umbrella" will not be presented to the user because the location area condition that has been applied to the action trigger has not been met when the user defined event has been met.

A person proximity condition may be met if the user device 106 of the user is within a certain distance from an identified user device of a particular person or group. In some implementations, the distance of the user device 106 from an identified user device may be provided by the action trigger processor 124 or the user may be able to adjust the distance. Further, in some implementations, for the action trigger processor 124 to recognize the user devices of the particular person or group, the user device 106 may need to include the particular person or group as a contact or otherwise identify the person or group. However, in other implementations, the action trigger processor 124 can identify user devices of particular people and groups around the user device 106. For example, the user may create a trigger action that includes a user defined action for a reminder to "Discuss camping trip," a user defined event of "when chance of rain is greater than 50% (during the trip dates)," (e.g., the user can select if this forecast is for a current location or specify a different location) and a person proximity condition of "David." The action trigger processing system 120 would then notify the user device 106 of the user to "Discuss camping trip" when the action trigger processing system 120 determines the occurrence (e.g., predicts the user defined event to occur during the trip dates) of the user defined event of the chance of rain is greater than or equal to 50% and is in personal proximity with "David." Additionally, the user may also include a time period condition and/or a location area condition.

Event data 128 includes data that defines information that is available to action trigger processor 124. For example, event data 128 can include world knowledge of news, weather, traffic, sports and entertainment information, travel, health, other events, and financial information, among others. Event data 128, in some implementations, may be derived from a larger information source 130, such as data searched by a search engine 132. The information source may be a web corpus, a knowledge graph, data feeds, and any other source of information from which data for a variety of disparate and unrelated events can be determined. Additionally, the information source 130 may also include information that is provided by third parties, such as third-party applications and services (e.g., a weather reporting and forecasting service).

Additionally, different types and amounts of data and content may be accessed and/or obtained as event data 128. For example, some content of resources in the information source 130 may be information that is generally available and accessible from the resource publisher (e.g., application publisher or website publisher). Further, some content of resources accessible of the information source 130 may be information that is not personalized to a particular user, but the content nonetheless may require the user to sign in, or otherwise provide authorization, for access to the content of the resource. Moreover, some content of resource may be information that is personalized, and possibly private, to a particular user. These resources may be proprietary to the resource publisher and can also require login or authentication information from the user to access the personalized information and content of the user. One or more various methods (beyond the scope of the present disclosure) may be employed to obtain user credentials for accessing proprietary or private data if and as appropriate, with the aim of maintaining user's data security and privacy.

In some implementations, after an action trigger is created with a user defined action and a user defined event, the action trigger processor 124 may cause a search to be performed, such as via the search engine 132 or crawl the data in the event data 128 to determine a status of the user defined event (e.g., when the user defined event will occur). Action trigger processor 124 may continuously or periodically (e.g., poll the event data 128 at regular or irregular intervals) search and/or crawl the data in the event data 128 to determine the status of the user defined event. In some implementations, the status and information of the user defined event may be pushed from event data 128 by the search engine 132 to action trigger processor 124. Action trigger processor may thus obtain near-real time or up to the minute information related to the information of the user defined event should such a frequency be required.

More generally, the action trigger processor 124 may be configured to cause a periodic search of the information source 130 for the occurrence of events. How often the occurrence of a particular event occurs may depend on the event type. For example, events having a very volatile nature, such as stock prices, may be searched every five minutes; conversely, events that are less volatile, such as weather conditions, may be searched hourly. Thus a search period for an event type is based on the event's likelihood to change; events for which data changes quickly relative to events for which data changes slowly will have a higher search frequency than the events for which data changes slowly. Action trigger processor 124 may obtain real time or up to the minute information related to the information of the user defined event.

Figure 2:
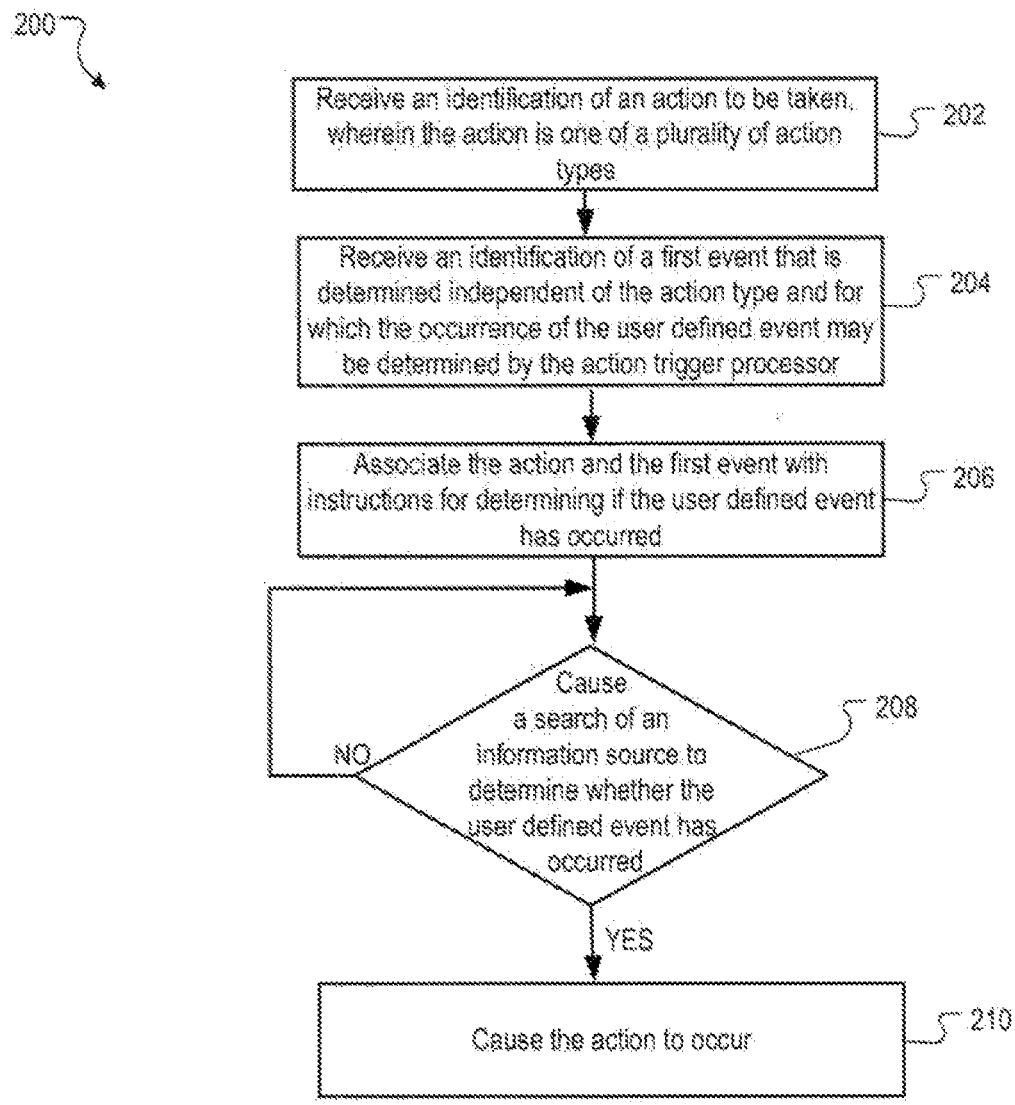
FIG. 2 is a flow diagram of an example process for creating and being notified of a user defined action when a user defined event is determined to be performed.

FIG. 2 is a flow diagram of an example process 200 for creating and being notified of a user defined action when a user defined event is determined to be performed. The process 200 can, for example, be implemented by the action trigger processor 124. In some implementations, the operations of the example process 200 can be implemented as instructions stored on a non-transitory computer readable medium, where the instructions cause a data processing apparatus to perform operations of the example process 200.

The processor 124 receives an identification of an action to be taken, where the action is one of a plurality of action types (202). The action trigger processor 124 may receive, for example, input at user device 106 that describes a user defined action. The user defined action is the action the user would like to be performed when the occurrence of an event is determined. The action may be, for example, the presentation of a reminder to do something, or the presentation of a confirmation command to have something done on behalf of the user, or an action that is fully or partially automatically performed without a reminder or confirmation to perform the action. The action type relates to the subject matter of the action. For example, a movie reminder is a "movie" or "entertainment" action type; a grocery list reminder is a "grocery" action type; a stock purchase action is a "financial" action type, and so on. The action trigger processor 124 will store the user defined action in action trigger data 126 for a particular action trigger.

The processor 124 receives an identification of a first event that is determined independent of the action type and for which the occurrence of the first event may be determined by the action trigger processor 124 (204). The first event is determined independent of the action type of the first action in that it is not selected from a list that is dependent on the action type of the first action, but rather is defined by the user according to one or more inputs. For example, a user may specify the event verbally, e.g., "When Team A plays Team B," or may search an information source for events. Whatever method is used, the events that are presented to the user for selection are determined independent of the action type of the first action. For example, a user may specify a first action as a reminder to "Go to the movie Consequences" and the events are "If forecast for rain is greater than 50%" and "Saturday afternoon." The events—a weather event and a time condition—are not dependent to the action type of "movie." In other words, the event associated with the action may be any event that can be derived or detected from a large information corpus.

The processor 124 associates the action and the first event with instructions for determining if the first event has occurred (206). For example, the processor 124 writes instructions that cause the processor 124 to formulate a query for the action and periodically send the query to a search engine 132 to search an information source for data indicating the occurrence of the first event. The frequency of the search may depend on the volatility of the event, as described above. In some implementations, if the search indicates a non-changing event condition, the action trigger processor 124 need not search the information source 130 again, and may store the non-changing event condition as a trigger. An example of a non-changing event condition is a particular date, a particular time, or any other event for which the occurrence can be determined in advance. To illustrate, for the event "Thanksgiving 2016," the date is November 26. Thus, a search for the event in July 2016 would result in the date, and subsequent searches between July and November 26 would not be required. Non-changing events, such as events that resolve to definite dates, times, etc., may be pre-specified.

The processor 124 causes a search of the information source to determine whether there has been an occurrence of the user defined event (208). For example, the action trigger processor 124 may cause the search engine 132 to search event data 128 in the information source 130 (or establish a search schedule that is performed by search engine 132 until canceled). As described above, the searches for each event may be done periodically. In some implementations, action trigger processor 124 may register events with the search engine and the search engine 132 may push data specifying the occurrence of events to the action trigger processor 124 when the events occur. Searching the information source 130 may be performed by providing a query to the search engine. The query may be generated from the event defined in the event data.

If the processor 124 determines the user defined event has occurred, then the processor 124 causes the action to occur (210). Otherwise, the processor 124 will again cause a search to be made, e.g., another periodic search, if the user defined event is determined to have not occurred.

In some implementations, action triggers may be tested for validity and/or expiration. For example, if an action trigger receives as an event a date in the past, the event may be flagged as invalid. Likewise, if an action trigger never triggers and the world conditions are such that the action trigger will never trigger in the future, the action trigger may be flagged as expired. An example of the latter is a multi-event action for which all events must occur, and one of the events is a date event, e.g., "Buy 10 shares of Company X Stock Before December 31, 2015, and when Company X Stock is less than $400 a share." Once the date has passed, and the action has never triggered, e.g., because Company X stock does not fall below $400 by December 31, the action trigger is flagged as expired.

Figure 3A:
FIG. 3A is an illustration of a user interface at a user device in which an action trigger is created.

FIGS. 3A-3D depict example user device user interfaces for setting and managing world knowledge triggers. In the examples of FIGS. 3A-3D, the user first defines an action, and then provides additional terms for events that are to be related to the action. In particular, FIG. 3A is an illustration of a user interface 302a at a user device 300 in which an action trigger is created. At user defined action input field 304, the user may enter the action that the user would like to be performed or presented with when a user defined event is determined to be performed. In FIG. 3A, the user defined action is in the process of being input into the user defined action input field 304. On the current user device 300, the user may use a touch screen of the user device 300 to enter the terms and characters for the user defined action. However, such a configuration is not required, and other methods and user device types may be used to input characters and terms. For example, as previously mentioned, voice input may be another way to provide the terms and characters of the user defined action.

Figure 3B:
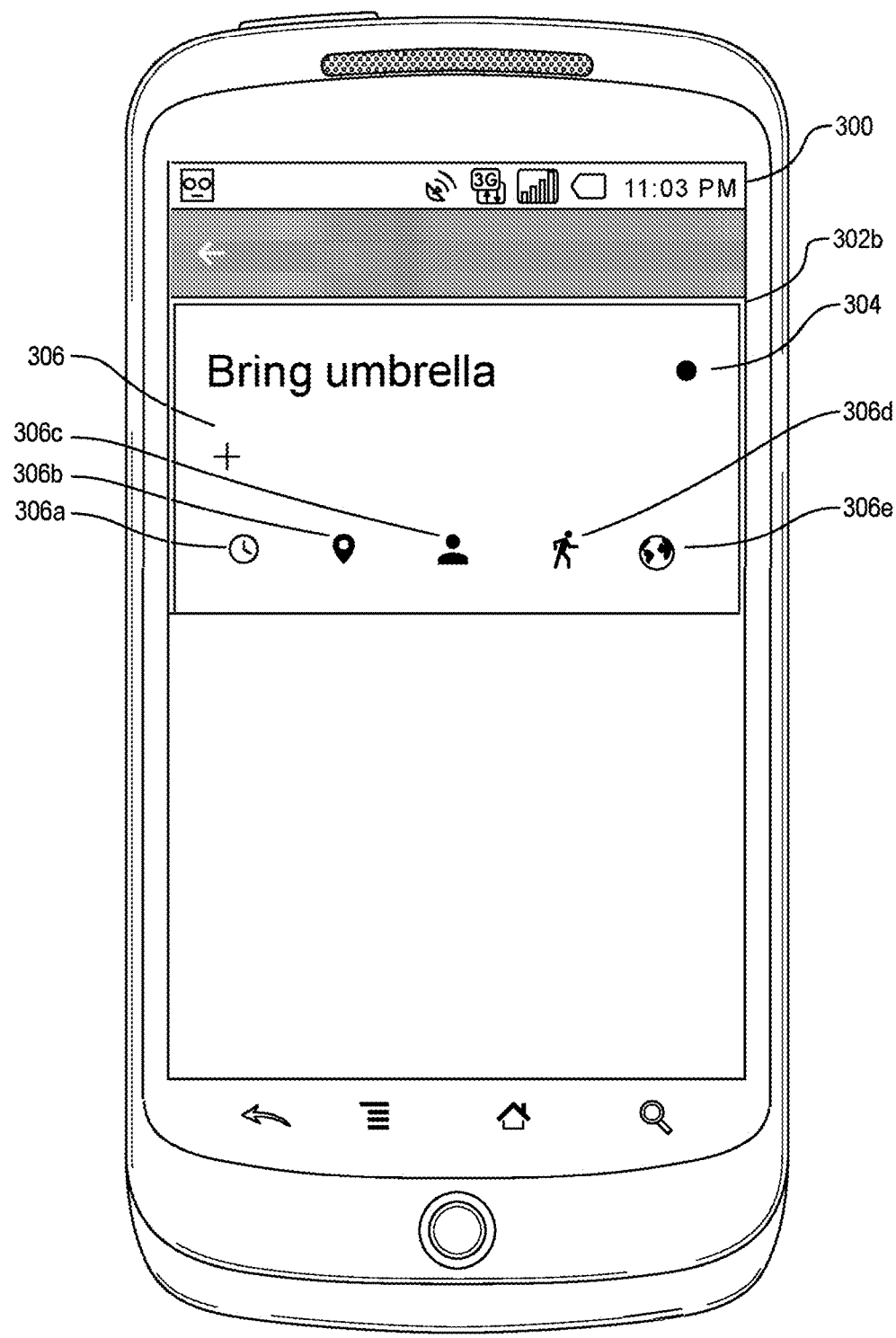
FIG. 3B is an illustration of a user interface at a user device where the user creates a user defined event.

In FIG. 3B, a user interface 302b is provided where the user defined action has been input in the user defined action input field 304, and the user can create an event by selecting in the area of the event field 306. After selecting in the area of the event field 306, the user is presented with event options, which in the current implementation include time period condition 306a, a location area condition 306b, a person proximity condition 306c, a reminder activity 306d, and a world knowledge condition 306e.

Figure 3C:
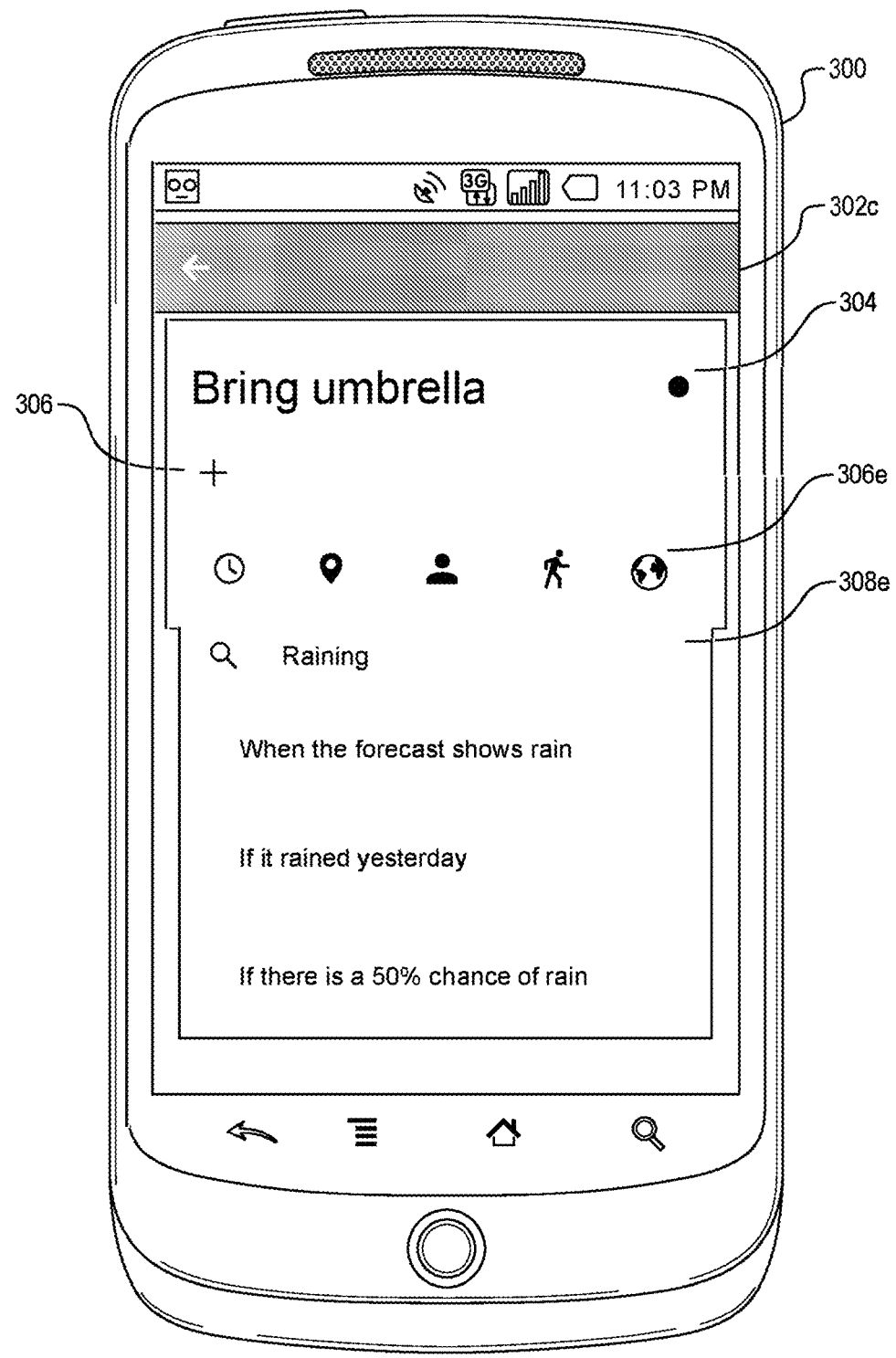
FIG. 3C is an illustration of a user interface at a user device where a user defined event is input.

Further, in FIG. 3C, a user interface 302c is provided where after the user selects the world knowledge option 306e, a user defined event field 308e may be provided. The user defined event field 308e, in the current implementation, includes an input field where textual characters and terms may be input. For example, in the current example, the term "Raining" has been input in user defined event field 308e. Also, user defined event field 308e includes user defined event options that include the terms or characters provided in the input field of the user defined event field 308e. For example, in the current example, the user defined event options include the options of "When the forecast shows rain," "If it rained yesterday," and "If there is a 50% chance of rain." Although three user defined event options are included in the current example, more or fewer user defined event options may be provided.

In the current implementation, the user defined event options can be provided from the event data 128 via the action trigger processor 124 based on information included in the event data 128 or information stored at the user device 106. For example, the event data 128 may provide common or similar entries based on the textual characters that have been input in the input field of the user defined event field 308e (e.g., as performed on a search engine). Such information may be determined based on information in the knowledge base system 130 and by use of the search engine 132. Additionally, there may be a user history of user defined events stored in the action trigger data 126 and/or event data 128. The user defined event options can include one or more of the user defined event entries within the user history of user that match or are similar to the textual characters that have been input in the input field of the user defined event field 308e along with other common or similar entries. The common or similar entries may be determined based on the textual characters that are input and/or based on other user's entries and selections when those particular textual characters are input. However, such a configuration is not required, and presenting user defined event options are not required.

Figure 3D:
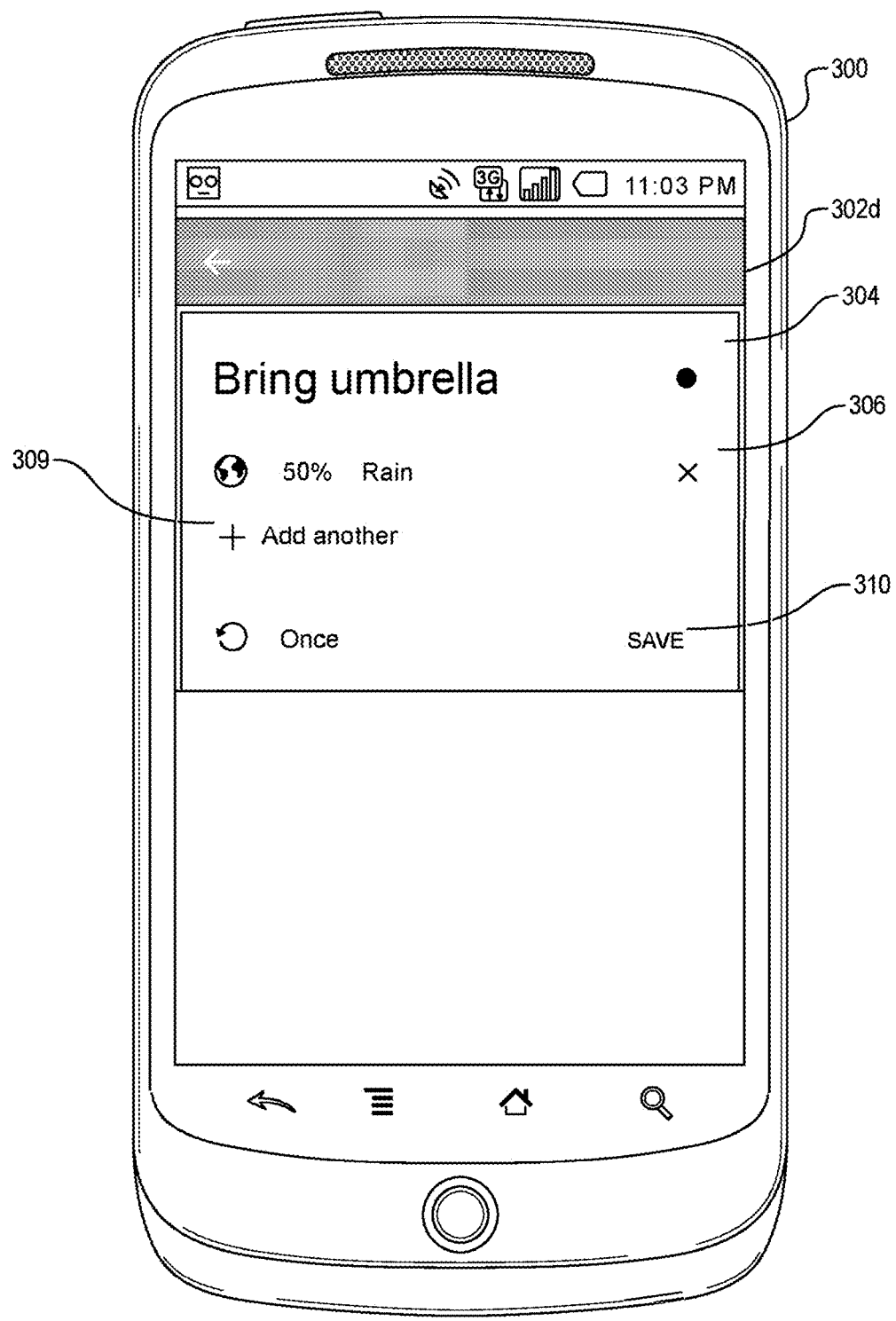
FIG. 3D is an illustration of a user interface at a user device where a user defined event is presented under a user defined action.

In FIG. 3D, a user interface 302d is provided where after the user has provided the user defined event of "50% chance of Rain," the event field 306 includes the user defined event of "50% chance of Rain" below the user defined action of "Bring umbrella" in the user defined action input field 304. Additionally, the user may add additional events, as seen by the add event option 309 in the event field 306 to "Add another." The user may indicate the action trigger is complete by, for example, selecting the save option 310, or other options may be provided for completing the action trigger.

Figure 4A:
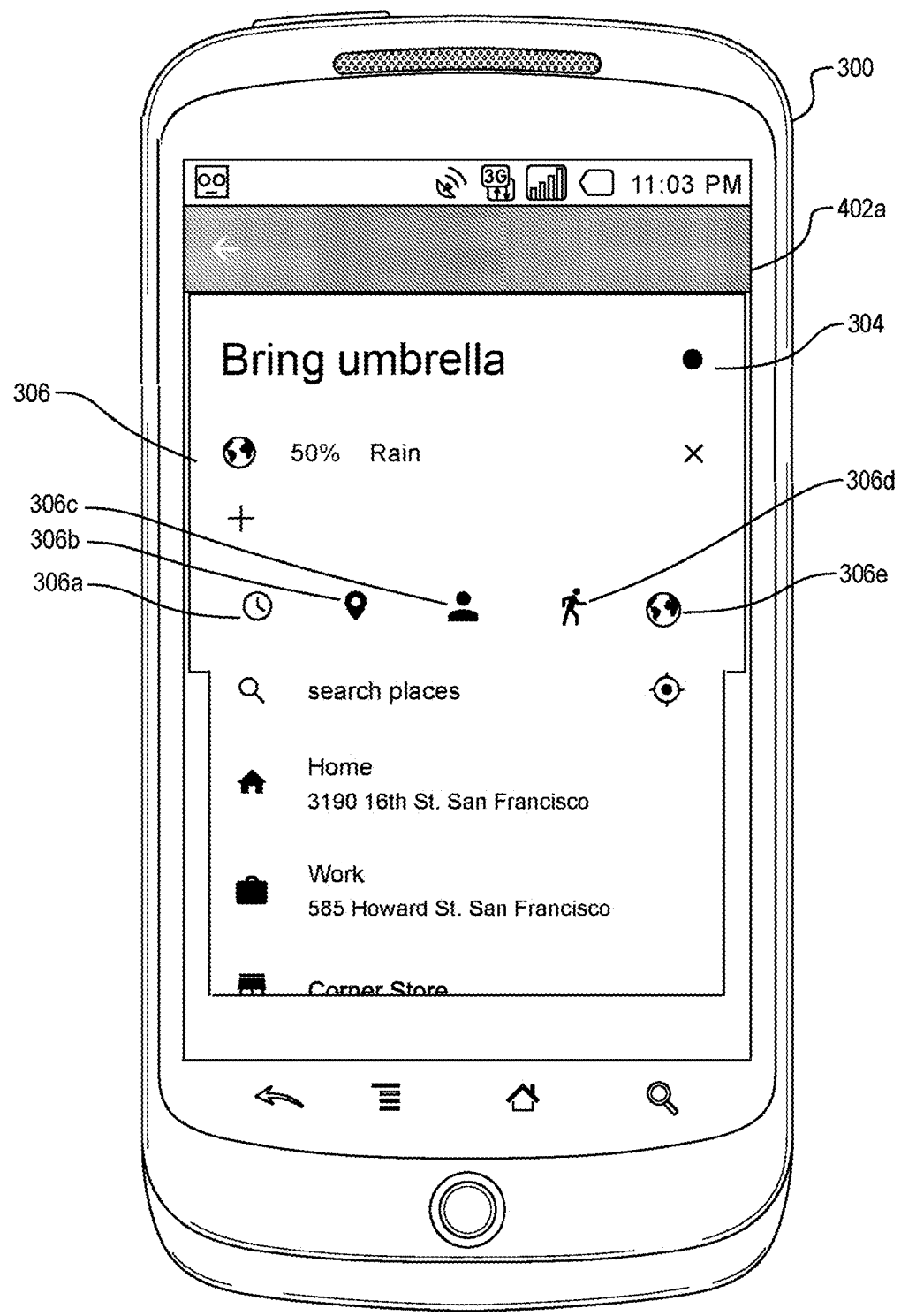
FIG. 4A is an illustration of a user interface at a user device in which a trigger condition is created.
Figure 4B:
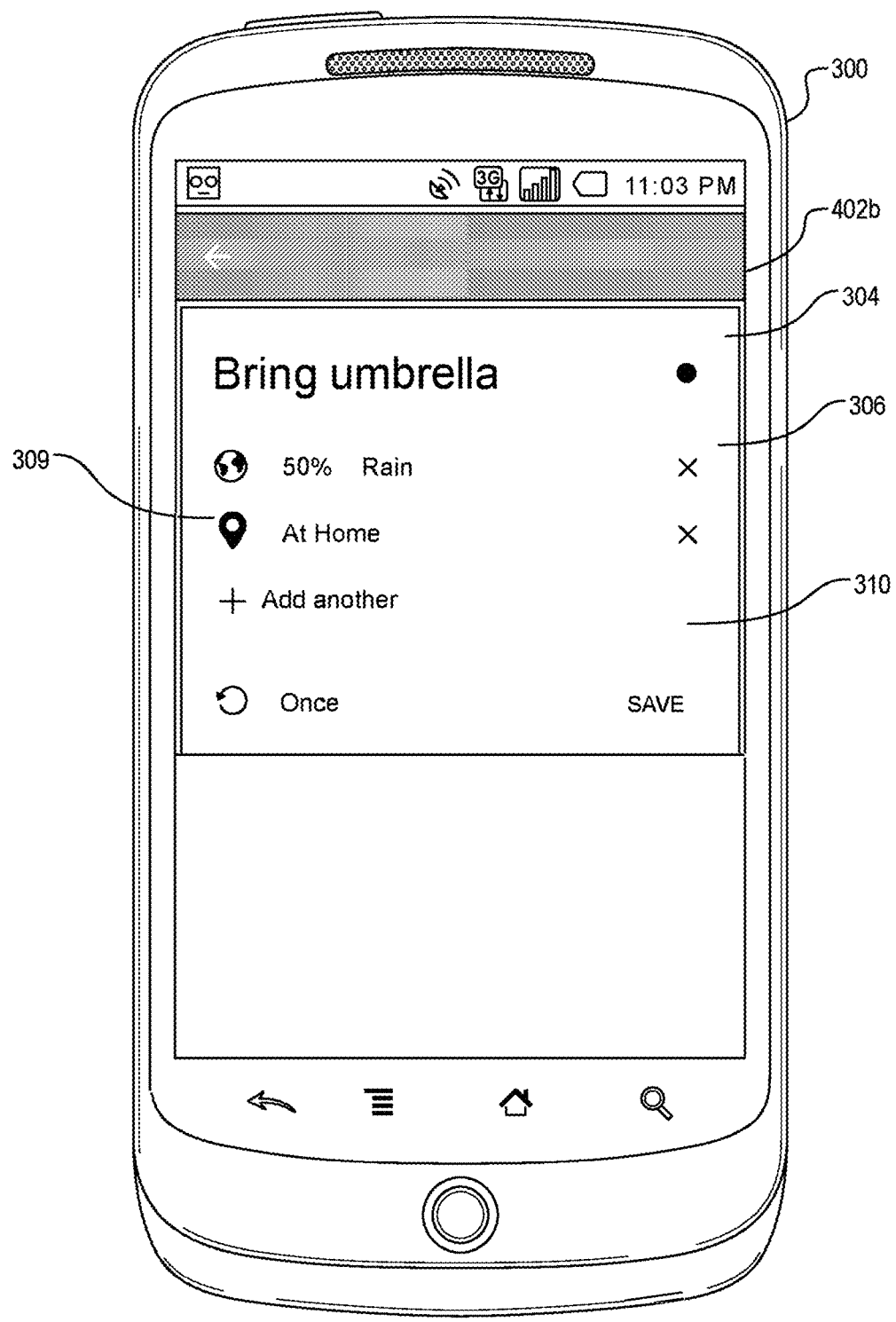
FIG. 4B is an illustration of a user interface at a user device in which a trigger condition has been added to the action trigger.

FIGS. 4A and 4B provide a description of adding other events, such as a location event. If the user selects the location area condition 306b, then the user may select a location area where the user device must be determined in order to trigger the user defined action. The user may specify a location by use of an address, by GPS coordinates, semantically, such as by naming a store, or by any input that can be resolved to a particular location. The location trigger condition may be an area around a particular location (e.g., house address, work address, GPS coordinates of a favorite bar identified by the user, among others) or type of location (e.g., grocery store, airport, hospital) that the user device is to be within or near for the activity condition to be met. For example, the location area condition may be "At Home," which may be defined by the user on the user device 106. Additionally, "near" can be a particular distance from (e.g., feet or miles) or amount of time away by different modes of transportation (e.g., by car, public transportation, walking) from the identified location. Additionally, the location area condition may provide an input field and selections options similar to that of the world knowledge option 306e, as previously described.

As seen in FIG. 4B, user interface 402b is provided when the user has selected a location trigger condition of "At Home." As such, in the current example, the user defined action of "Bring umbrella" will be triggered if the user defined event of "50% chance of rain" is determined when the user is "At Home." Additionally, as described in FIG. 3D, the user may add additional events by selecting the add event option 309.

Figure 5:
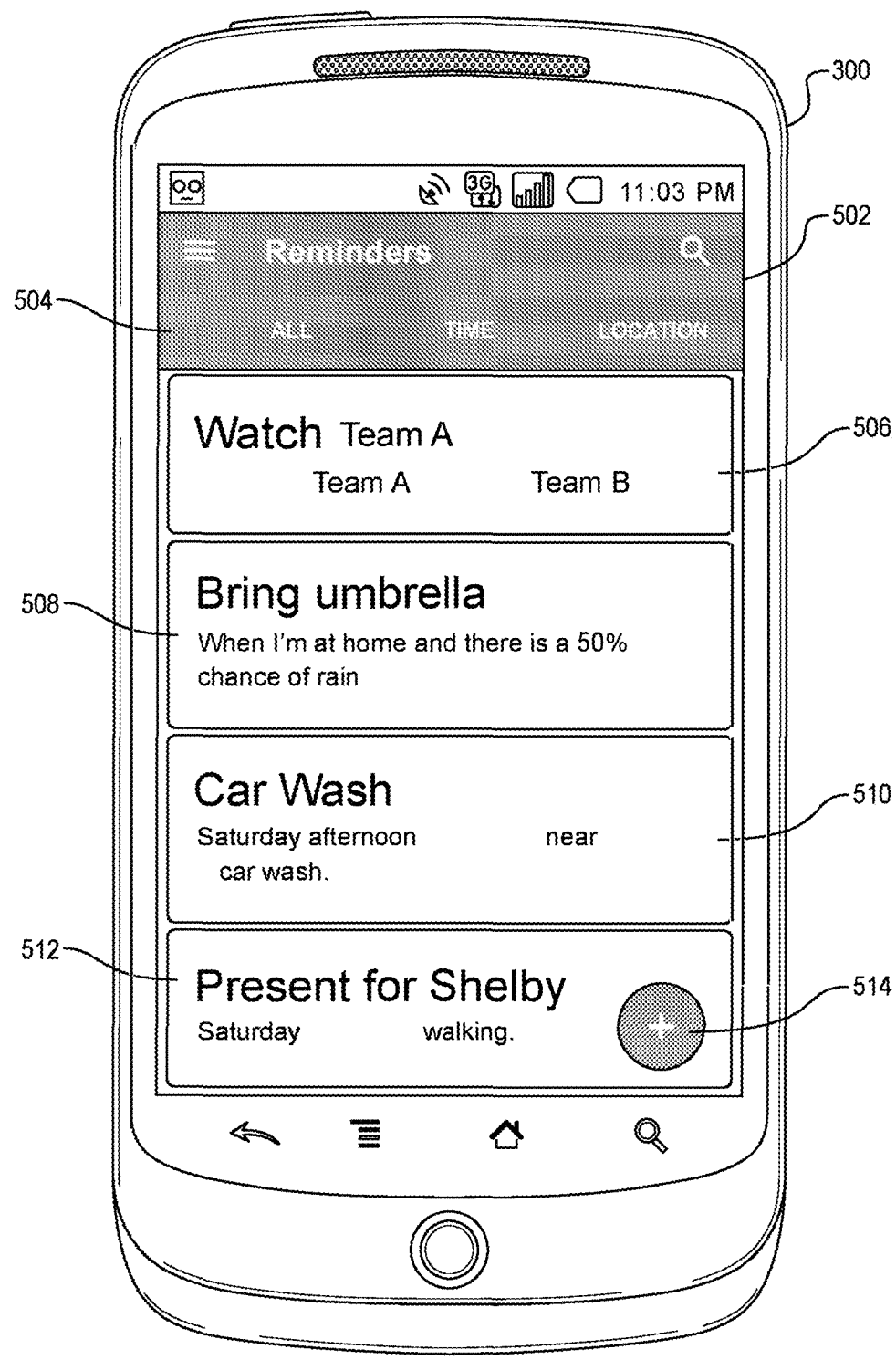
FIG. 5 is an illustration of a user interface at a user device in which a list of action triggers are provided.

FIG. 5 is an illustration of a user interface 502 at a user device 300 in which a list of reminders are provided. The list of reminders may be filtered based on the filters 504. In the current implementation, filters 504 include "ALL," "TIME," and "LOCATION." However, in other implementations, different filters and more or fewer filters may be provided. Also, action triggers 506, 508, 510, and 512 are provided in the current implementation. Action trigger 508 includes the user defined action, user defined event, and action trigger that were created and defined in FIGS. 3A-4B. Additionally, an action trigger may be created from user interface 502 by selecting the add option 514. In some implementations, by selecting the add option 514, the user may be directed to the user interface 302 provided in FIG. 3A.

Figure 6:
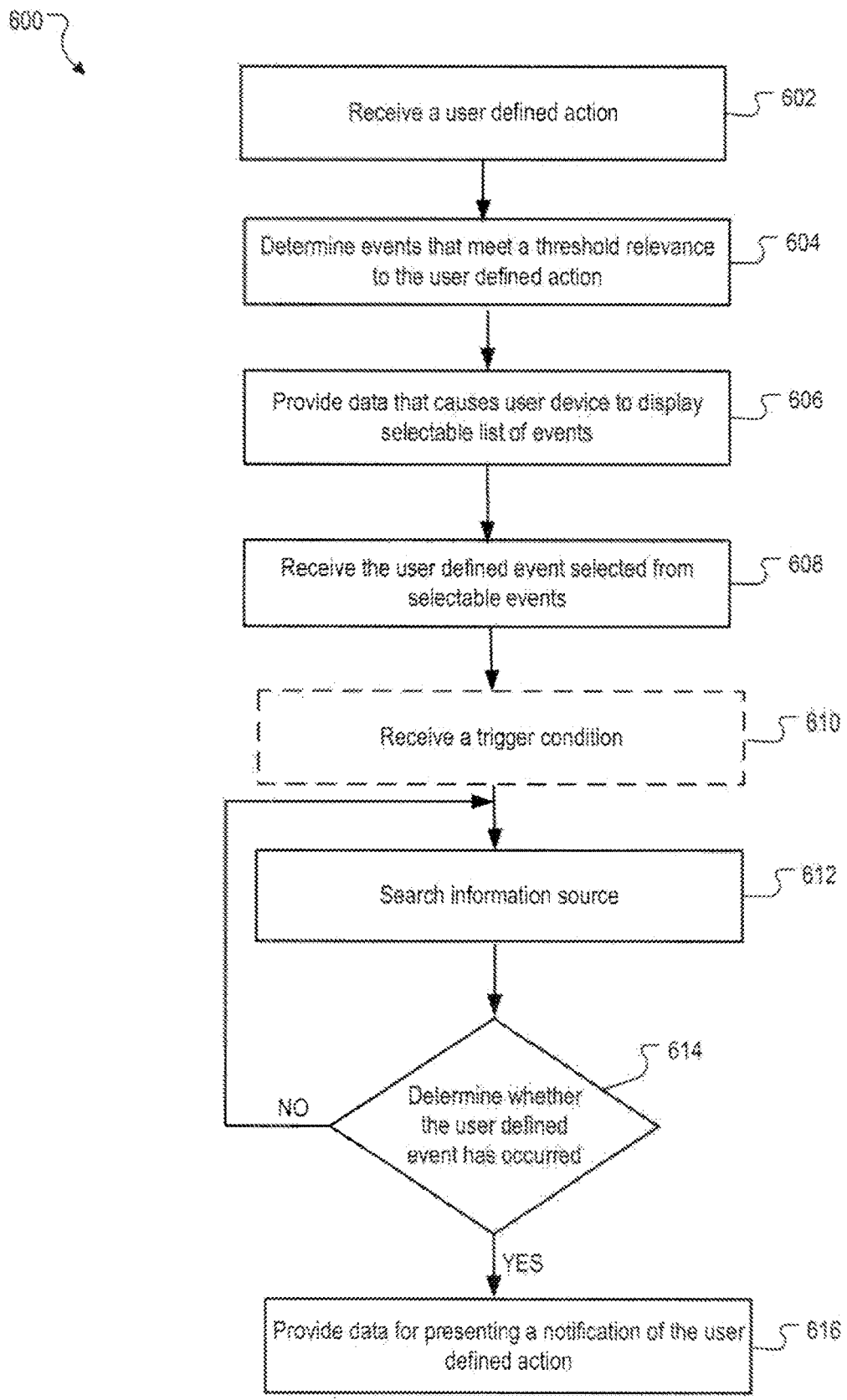
FIG. 6 is a flow diagram of another example process for creating and being notified of a user defined action when a user defined event is determined to be performed.

FIG. 6 is a flow diagram of an example process 600 for creating and being notified of a user defined action when a user defined event is determined to be performed. The process 600 can, for example, be implemented by the action trigger processor 124. In some implementations, the operations of the example process 600 can be implemented as instructions stored on a non-transitory computer readable medium, where the instructions cause a data processing apparatus to perform operations of the example process 600.

A user defined action is received by the action trigger processor 124 (602). The action trigger processor 124 may receive input at user device 106 that includes a set of terms that describe a user defined action. The user defined action is the action the user would like to be performed or reminded of when the occurrence of the user defined event is determined. A user defined action may include a plurality of characters, and may be, for example, "Bring umbrella," "Wash Car," "Clean the house," or any other user defined action. The reminder processor 124 will store the user defined action in action trigger data 126 for a particular action trigger.

Events that meet a threshold relevance to the user defined action are determined using the information source 130 (604). To identify the events, the system can use the user defined action to search for events, or, alternatively, may receive additional terms or input from the user that are used to search for events. In the case of the former, for example, search engine 132 may determine relevant events based on the characters and terms of the user defined action and from searching the knowledge base. The action trigger processor 124 may process the input and form a query, for example, to search for related events that meet a threshold relevance. In variations of this implementation, the search engine 132 (or the action trigger processor 124) may access data describing events selected by other users that input the same or similar user defined actions. For example, if the user provides a user defined action of "Bring umbrella," the information source 130 may determine events that are related to umbrellas (e.g., rain forecasts from a weather service), events that users have input or selected when providing the same or similar user defined action of "bring umbrella," or events that have a relationship with or connection to the terms in the user defined action, such as events related to rain. A threshold may be determined based on how similar the event is to the user defined action. For example, a score or other type of identifier of similarity may be used to determine the level of similarity between the event and the user defined action.

To generate a query, the action trigger processor 124 may parse the input to remove stop words, submitting the terms of the user defined action to a query rewriter to generate one or more query, using the user defined action as a query, or other query generation techniques may be used. Machine learning may also be used to match a provided query to one of a plurality of possible user defined actions. The search engine 132 may determine relevant events, as previously described, based on the query provided from the information and terms provided in the user defined action.

In the case of the latter in which the system receives additional terms from the user that are used to search for events, a user may define an action reminder, and then describe a parameter for that action reminder that the user wants to relate to the event trigger. This latter implementation provides for much more flexibility for associating events with an action. In particular, events that are specific to the user or specified by the user as being relevant to the action can be associated with the action. For example, the user may create a user defined action of a reminder to "Go pick up wife." The user may then input a query "Flight 1234 to San Francisco" for the creation of the user defined event. The search engine 132 may determine relevant events for the user defined event, as previously described, which may be, for example, "when landing at scheduled time (11:00 AM)," "when landing at actual time (TBD)," "one hour before landing at actual time (TBD)," or "one hour before landing at schedule time (10:00 AM)." Accordingly, even though a system may not be able to automatically associate specific flight times with a user's defined action, the system, by use of the secondary event input for a prior defined action, can identify multiple events based on the secondary event input and thus enable the user to associate a wide range of events with the user-defined action.

Data that causes the user device 106 to display a list of selectable events is provided to the user device (606). The events include the events that meet the threshold relevance, and are those that the action trigger processing system 120 has identified and may be able to determine based on the information in the information source 130.

Data describing a user defined event that is selected from one of the selectable events is received (608). The user of the user device 106 may select one of the selectable events that are displayed to the user device to determine the user defined event. After determining an occurrence of a user defined event, the action trigger processor 124 may present the user defined action to the user device 106, and in some implementations, the action trigger processor 124 will perform the user defined action associated with the user defined event.

In some implementations, an action trigger condition can be provided to the action trigger processor 124 by the user device (610). An action trigger indicates a condition to be satisfied in determining the occurrence of the user defined event. For example, action triggers may be, as previously described, one or more time period condition, location area condition, or person proximity condition.

Further, the system searches (or causes a search of) the information source to determine whether there has been an occurrence of the user defined event (612). For example, the action trigger processor 124 may cause the search engine 132 to search the information source 130 for data indicating occurrence of the user defined event. Action trigger processor 124 may continuously or periodically (e.g., poll the event data 128 at regular or irregular intervals) search and/or crawl the data in the event data 128 to determine the status of the user defined event. In some implementations, the status and information of the user defined event may be pushed by the search engine 132 to the action trigger processor 124.

Next, the system determines whether there is an occurrence of the user defined event (614). After obtaining the information from the knowledge base system 130, the action trigger processor 124 may compare the information received from the knowledge base system 130 to the user defined event in order to determine whether there has been an occurrence of the user defined event. Based on the example above, where the user defined action is "Bring umbrella" and the user defined event is "50% chance of Rain," the information source 130 may update weather information in the location of the user of the user device 106, and the action trigger processor 124 may periodically or continuously receive (e.g., push or poll) the updates. When the action trigger processor 124 receives the updates, the action trigger processor 124 may determine whether or not the user defined event has occurred. If the user defined event does not occur, the action trigger processor 124 may again cause a search of the information source 130 to be done.

After determining the occurrence of the user defined event, the action trigger processor 124 may provide data to the user device 106 so that the user device may present a reminder of the action (616). In other implementations, once the action trigger processor 124 determines an occurrence of the user defined event, the action trigger processor 124 and/or other component of action trigger processing system 120 may perform the user defined action (e.g., automatically) and, in some implementations, provide a notification to the user device 106 that the user defined action has been initiated or complete. Additionally, in some implementations, the notification may be provided by the action trigger processor 124, and the user of the user device 106 may access information related to the user defined action; however, presentation of the notification at display of the user device 106 is not required. The notifications the user receives may be notifications provided on a mobile device (e.g., Android notifications, In-app notifications, etc.), or notifications on a desktop (e.g., browser notifications, OS notifications, etc.). Within the notification, a link or button to perform an operation associated with the user defined action may be provided. For example, if the user defined action is "Call Dave," and the user defined event is "when the President's State of the Union Address is on," then when a notification is provided including the user defined action of "Call Dave," a link or button may be included to call Dave. In some implementations, the link or button may be included when the action trigger processor 124 recognizes an action to be performed (e.g., recognize to call Dave and "Dave" is included in contacts of the user device 106).

Moreover, in some implementations, the presentation of the user defined action or performance of the user defined action may be provided to a device other than user device 106. For example, the presentation may be provided to a device that is determined to be close to the user or a device that the user will see or is looking at. For example, if the user device 106 of the user has not been used by the user for a threshold period of time, the user, and the user is using another device, the action processing system 120 may determine to present the user defined action to the device the user is using In situations in which the systems discussed herein collect personal information about users, or may make use of personal information, the users may be provided with an opportunity to control whether programs or features collect user information (e.g., information about a user's social network, social actions or activities, profession, a user's preferences, a user's current location, location trajectory, inferred locations such as home/work, inferred context, calendar data, upcoming events/bookings from email, etc.), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 7:
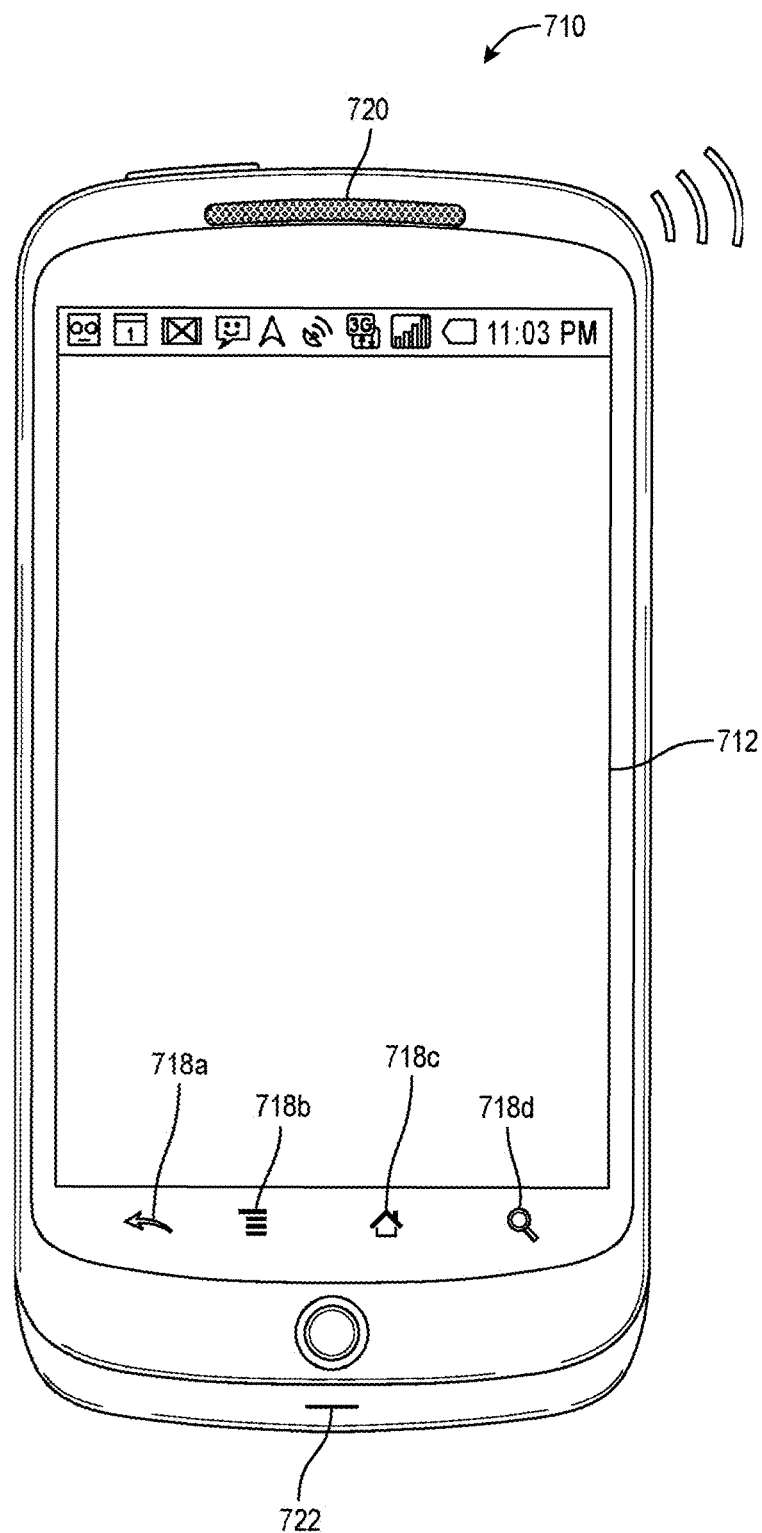
FIG. 7 is a block diagram of an example mobile computing device.

FIG. 7 is a block diagram of example mobile computing device. In this illustration, the mobile computing device 710 is depicted as a handheld mobile telephone (e.g., a smartphone, or an application telephone) that includes a touchscreen display device 712 for presenting content to a user of the mobile computing device 710 and receiving touch-based user inputs. Other visual, tactile, and auditory output components may also be provided (e.g., LED lights, a vibrating mechanism for tactile output, or a speaker for providing tonal, voice-generated, or recorded output), as may various different input components.

The mobile computing device 710 may include mechanical or touch sensitive buttons 718*a-d*. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

The mobile computing device 710 may include other applications, computing sub-systems, and hardware. A voice recognition service 772 may receive voice communication data received by the mobile computing device's microphone 722, and translate the voice communication into corresponding textual data or perform voice recognition.

The mobile computing device 710 may communicate wirelessly with one or more networks to provide a variety of services, such as voice and data services.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computing system, the system comprising:
   one or more processors; and
   one or more non-transitory computer-readable media that collectively store instructions that, when executed by the one or more processors, cause the computing system to perform operations, the operations comprising:
      receiving an input;
      processing the input to determine a user defined action, wherein the user defined action is associated with a first action of a plurality of different actions;
      processing the input to determine a user defined trigger event, wherein the user defined trigger event is associated with a first event;
      processing the user defined action and the user defined trigger event with an action trigger processing system, wherein the action trigger processing system periodically searches a knowledge base, via a search engine, to determine whether the first event has occurred;
      receiving instructions from the action trigger processing system to perform the action in response to the action trigger processing system determining the first event has occurred; and
      performing the action identified by the user defined action.

2. The system of claim 1, wherein the action is associated with interacting with one or more web platforms based on the occurrence of the first event.

3. The system of claim 1, further comprising:
   determining an event type for the first event from a plurality of event types;
   determine a volatility associated with event type, the volatility being an indicator of a likelihood of change for the event type; and
   selecting a search period for the instructions based on the determined event type.

4. The system of claim 3, wherein event types that are different from each other have different search periods, and wherein the search period is selected so that a frequency of a search is higher for events with higher volatility and lower for events with lower volatility.

5. The system of claim 1, wherein the input is received via a user interface, wherein the user interface is configured to set and manage one or more world knowledge triggers.

6. The system of claim 1, wherein the operations further comprise:
   receiving a selection of an add additional events option displayed in the user interface; and
   providing an additional user defined event field for display via the user interface.

7. The system of claim 6, wherein the operations further comprise:
   receiving an additional event input associated with the additional user defined event field; and
   transmitting the additional event input to the action trigger processing system.

8. The system of claim 1, wherein the operations further comprise:
receiving an identification of a second event that is determined independent of an action type for the action; and
processing the second event, the user defined action, and the user defined event input with the action trigger processing system.

9. The system of claim 8, wherein determining whether the first event has occurred comprises also determining whether the second event has occurred; and
wherein the operations further comprise:
in response to determining that the first event has occurred, causing the action to occur comprises in response to determining that both the first event and the second event have occurred, causing the action to occur.

10. The system of claim 8, wherein determining whether the first event has occurred comprises also determining whether the second event has occurred; and
wherein the operations further comprise:
in response to determining that the first event has occurred, causing the action to occur comprises in response to determining that either the first event or the second event have occurred, causing the action to occur.

11. A computer-implemented method, the method comprising:
receiving, by a computing system comprising one or more processors, an input;
processing, by the computing system, the input to determine a user defined action, wherein the user defined action is associated with a first action of a plurality of different actions;
processing, by the computing system, the input to determine a user defined trigger event, wherein the user defined trigger event is associated with a first event;
processing, by the computing system, the user defined action and the user defined trigger event with an action trigger processing system, wherein the action trigger processing system periodically searches a knowledge base, via a search engine, to determine whether the first event has occurred;
receiving, by the computing system, instructions from the action trigger processing system to perform the action in response to the action trigger processing system determining the first event has occurred; and
performing, by the computing system, the action identified by the user defined action.

12. The method of claim 11, wherein the action trigger processing system generates instructions that cause the action trigger processing system to monitor the knowledge base to determine whether the first event has occurred, wherein the instructions cause the action trigger processing system to formulate a query for the action and periodically send the query to a search system to search a first information source for data indicating an occurrence of the first event.

13. The method of claim 11, wherein the knowledge base comprises a knowledge graph.

14. The method of claim 11, wherein:
the action to be taken is presentation of a confirmation to take a second action;
performing the action to occur comprises sending data to a user device that causes the user device to present the confirmation; and
further comprising performing, by the system, the second action in response to receiving from the user device data indication acceptance of the confirmation.

15. The method of claim 11, wherein the first event is an event independent of a user that provided the input.

16. The method of claim 11, wherein:
the action to be performed is an action that is performed independent of a user computing device that provided the input.

17. One or more non-transitory computer-readable media that collectively store instructions that, when executed by one or more computing devices, cause the one or more computing devices to perform operations, the operations comprising:
receiving an input;
processing the input to determine a user defined action, wherein the user defined action is associated with a first action of a plurality of different actions;
processing the input to determine a user defined trigger event, wherein the user defined trigger event is associated with a first event;
processing the user defined action and the user defined trigger event with an action trigger processing system, wherein the action trigger processing system periodically searches a knowledge base, via a search engine, to determine whether the first event has occurred;
receiving instructions from the action trigger processing system to perform the action in response to the action trigger processing system determining the first event has occurred; and
performing the action identified by the user defined action.

18. The one or more non-transitory computer-readable media of claim 17, wherein the operations further comprise:
receiving, by a data processing apparatus and from a user device, data describing a selection of at least one trigger condition, the at least one trigger condition indicating a condition to be satisfied in determining the occurrence of the user defined event, an activity condition being different from the user defined event; and
wherein determining the occurrence of the user defined event further includes:
determining, by the data processing apparatus, whether the at least one activity condition has been satisfied in response to determining the occurrence of the user defined event.

19. The one or more non-transitory computer-readable media of claim 18, wherein the at least one activity condition is at least one of a time period condition, a location area condition, and a person proximity condition.

20. The one or more non-transitory computer-readable media of claim 17, wherein the operations further comprise:
providing, by a data processing apparatus, a notification that the user defined action has been performed.

* * * * *